United States Patent [19]

Zincke

[11] Patent Number: 5,092,074
[45] Date of Patent: Mar. 3, 1992

[54] FISH GRIPPING IMPLEMENT

[75] Inventor: Milo E. Zincke, Dodge Center, Minn.

[73] Assignee: Triangle Tool & Die & Machine, Inc., Cannon Falls, Minn.

[21] Appl. No.: 671,000

[22] Filed: Mar. 18, 1991

[51] Int. Cl.⁵ .............................................. A01K 97/00
[52] U.S. Cl. ....................................... 43/53.5; 81/418
[58] Field of Search ................... 43/53.5; 81/418, 421, 81/424, 424.5, 426, 308, 310

[56] References Cited

U.S. PATENT DOCUMENTS

| | | | |
|---|---|---|---|
| 3,012,360 | 12/1961 | Creel et al. | 43/53.5 |
| 3,367,703 | 2/1968 | Pittis | 81/418 |
| 3,825,990 | 7/1974 | Shields | 81/308 |
| 4,787,109 | 11/1988 | Bennett et al. | 81/418 |

Primary Examiner—Richard K. Seidel
Assistant Examiner—Chuck Y. Mah
Attorney, Agent, or Firm—Kinney & Lange

[57] ABSTRACT

An implement for gripping a fish includes first and second lever arms, each having a jaw portion, a handle portion and an intermediate portion therebetween. A pivot member pivotally couples the first lever arm to the second lever arm at their respective intermediate poritons such that manual manipulation of the handle portions toward and away from one another causes like movement of the jaw portions. The first lever arm includes a spike element which extends outwardly from the jaw portion and is configured to pierce a body region of the fish to provide a gripping force in addition to that provided by the coaction between the jaw portions. The spike element includes an adjusting mechanism for varying the extent to which the spike element projects outwardly from the jaw portion of the first lever arm. The gripping implement further includes a third lever arm having a jaw portion and a trigger portion. The third lever is pivotally coupled to the first and second lever arms by way of the pivot member for movement relative thereto. The jaw portions of the first and second lever arms and spike element are adapted to grip the upper lip of a fish. The third lever arm is configured to engage a lower lip of a fish to spread and hold open the mouth of a fish for removal of a fish hook or bait.

9 Claims, 2 Drawing Sheets

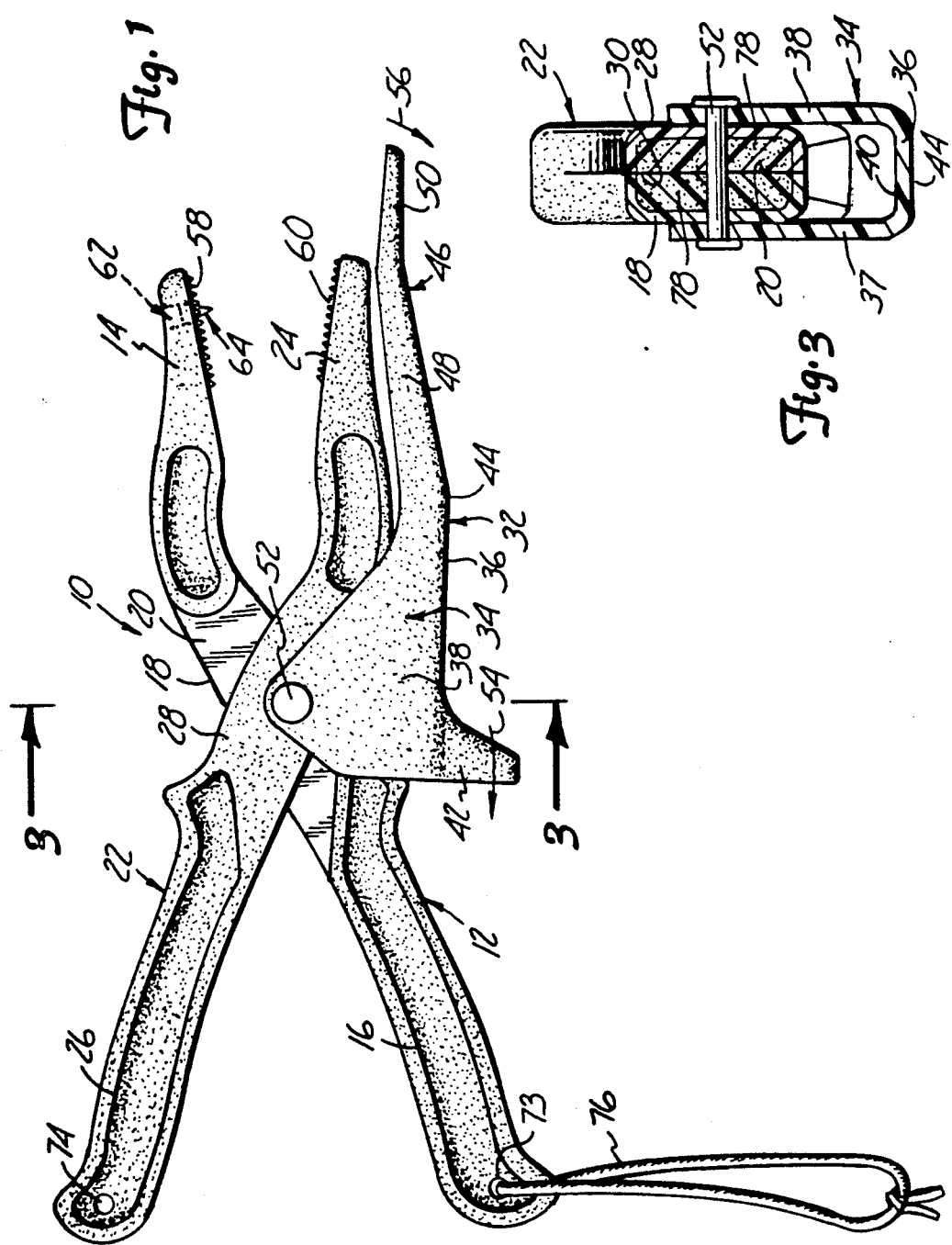

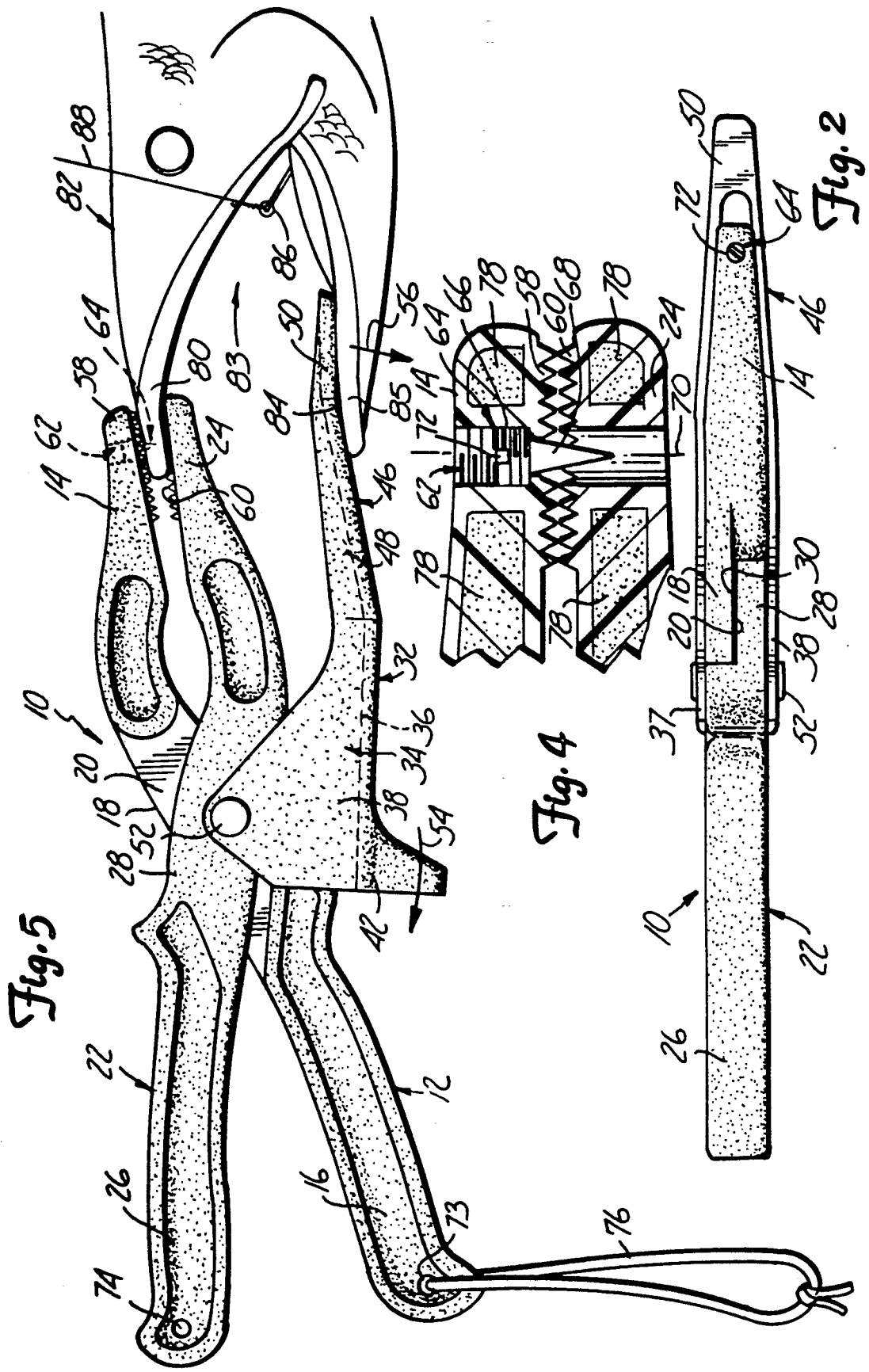

FISH GRIPPING IMPLEMENT

BACKGROUND OF THE INVENTION

The present invention relates to implements for handling fish. In particular, the present invention is an implement for gripping and spreading open the mouth of a fish so that a fish hook or bait can be removed.

Implements for gripping and spreading open the mouth of a fish are generally known. A fish mouth spreader and holder provides a simple and efficient device for opening the mouth of a fish and holding it open to permit easy removal of a hook and the placing of the fish on a stringer. U.S. Pat. No. 3,106,035 to Tennyson discloses one such implement for holding and spreading open the mouth of a fish. The fish mouth spreader and holder includes three plier levers. Two of the plier levers cross each other at mediate pivot portions. Both of these plier levers terminate in a jaw at one end and the opposite end of one lever includes a hand operable handle while the opposite end of the other lever includes an operator end. In operation, as the handle and operator end of the two plier levers approach each other, the jaws of the two plier levers also approach one another.

The third plier lever is also pivoted to the first two plier levers at its mediate portion. However, the third plier lever does not cross either of the first two plier levers and its jaw and handle portion remain on the same side of the pivot. The first two levers hold the upper lip of the fish while the third lever is used to engage and thereby spread and hold open the mouth of the fish for hook removal. However, due to the smooth nature of the jaws of the two plier levers, large fish or tenacious fish may at times work themselves free from the holding force provided by the first two levers.

It is evident that there is a continuing need for improved implements for gripping and spreading open the mouth of a fish. Specifically, there is a need for a gripping implement that provides a more secure and positive gripping force to prevent large fish and tenacious fish from wiggling free of the gripping implement. In addition, there is a need for a gripping implement of efficient design and light weight which is easy to use and can be carried in a fishing tackle box without adding a large amount of additional weight.

SUMMARY OF THE INVENTION

The present invention is an implement for gripping a fish. The fish gripping implement includes first and second lever arms, each having a jaw portion at one end, a handle portion at an opposite end and an intermediate portion therebetween. A pivot member pivotally couples the intermediate portion of the first lever arm to the intermediate portion of the second lever arm. Manual manipulation of the handle portions of the first and second lever arms toward and away from one another causes like movement of the jaw portions of the first and second lever arms toward and away from one another.

A spike element is mounted on and extends outwardly from the jaw portion of the first lever arm. The spike element projects toward the second lever arm jaw portion and is configured to pierce a body region of a fish as the jaw portions of the first and second lever arms move toward one another. The spike element provides a gripping force in addition to the gripping force provided by coaction between the jaw portions of the first and second lever arms.

The spike element includes a threaded portion which engages a threaded opening that extends through the jaw portion of the first lever arm. The threaded interengagement of the spike element and threaded opening allows rotation of the spike element about its longitudinal axis. Rotation of the spike element causes movement the spike element relative to the threaded opening which thereby varies the extent to which the spike element projects outwardly from the jaw portion of the first lever arm. The jaw portion of the second lever arm includes a through aperture which freely receives the spike element as the jaw portions of the first and second lever arms move toward one another.

The fish gripping implement further includes a third lever arm having a jaw portion, and a trigger portion. The pivot member pivotally couples the third lever arm to the first and second lever arms. Manual manipulation of the trigger portion pivots the third lever arm and causes the jaw portion of the third lever arm to move relative to the jaw portions of the first and second lever arms. The jaw portion of the third lever arm is longer than and therefore extends distally beyond the jaw portions of the first and second lever arms.

In use, the jaw portions of the first and second lever arms are adapted to grip an upper lip of a fish with the spike element piercing a portion of the upper lip to provide a gripping force in addition to that provided by the jaw portions of the first and second lever arms. When the jaw portions of the first and second lever arms are engaged with the upper lip of the fish, the third lever arm is within the mouth of the fish. The third lever arm is then pivoted via the trigger portion so as to engage an inner region of the lower lip of the fish, which separates the lips thereby opening the mouth of the fish. By holding the mouth of the fish open with the gripping implement, a fish hook or bait can be easily removed from the mouth of the fish. The spike element is configured such that it does no more harm to a fish than the fish hook or bait.

The handle portion of the first lever arm includes a lanyard which is adapted to extend about a wrist of a user of the fish gripping implement to help prevent the gripping implement from slipping out of the user's hand. In addition, the first and second lever arms are filled with foam flotation which allows the gripping implement to float in water in case the gripping implement is inadvertently dropped into a lake, stream or river.

This fish gripping implement is relatively uncomplicated, and the inclusion of the spike element provides a gripping force in addition to that provided by coaction between the jaw portions of the first and second lever arms. The added gripping force is useful, particularly when handling large or tenacious fish. In addition, the lanyard helps prevent the gripping implement from inadvertently slipping out of a user's hand, while the flotation within the first and second lever arms allows the gripping implement to float if dropped into the water.

The resultant efficient and lightweight design of this fish gripping implement allows a user to hold the mouth of a fish in an open position to remove a hook, plug or artificial bait while accomplishing the holding with the use of one hand that need never touch the fish. Hence, contact with the fish is avoided and oils on the outer surface of the fish are not disturbed. Therefore the gripping implement is particularly useful in catch and release type fishing.

The fish gripping implement allows big or small fish to be held with the proper degree of firmness and its lightweight design allows it to be easily carried in a tackle box. In addition, the fish gripping implement can be used to grip a fish during the cleaning process.

BRIEF DESCRIPTION OF THE DRAWINGS

FIG. 1 is a side elevational view of a fish gripping implement in accordance with the present invention.

FIG. 2 is a top elevational view of the fish gripping implement shown in FIG. 1.

FIG. 3 is a sectional view of the fish gripping implement taken along line 3—3 in FIG. 1.

FIG. 4 is a greatly enlarged side elevational view partially in section showing the particulars of a spike element that forms part of the fish gripping implement.

FIG. 5 is a side elevational view of the fish gripping implement of the present invention engaged with and holding open the mouth of a fish.

DETAILED DESCRIPTION OF THE PREFERRED EMBODIMENTS

A fish gripping implement 10 in accordance with the present invention is illustrated generally in FIGS. 1 and 2. The gripping implement 10 includes a first lever arm 12 having a jaw portion 14 at its distal end, a handle portion 16 at its proximal end and an intermediate portion 18 defined by a recessed surface 20 located between the jaw portion 14 and the handle portion 16. A second lever arm 22 has a jaw portion 24 at its distal end, a handle portion 26 at its proximal end and an intermediate portion 28 defined by a recessed surface 30 (see FIGS. 2 and 3) located between the jaw portion 24 and the handle portion 26.

The gripping implement 10 further includes a third lever arm 32. As seen in FIG. 3, the third lever arm 32 has a U-shaped proximal segment 34 defined by a base portion 36 and a pair of parallel legs 37 and 38 that extend outwardly from an inner surface 40 of the base portion 36. A trigger portion 42 extends outwardly from an outer surface 44 of the base portion 36. The third lever arm 32 further includes a jaw portion 46 at its distal end defined by first and second angled segments 48 and 50, respectively, which are contiguous with the base portion 36. As seen in FIG. 1, the second angled segment 50 extends distally beyond the jaw portions 14 and 24 of the first and second lever arms 12 and 22.

As seen in FIG. 3, a pivot member such as a rivet 52 extends through the legs 37 and 38 of the third lever member 32 and through the intermediate portions 18 and 28 of the first and second lever arms 12 and 22, respectively, to pivotally couple the first, second and third lever arms 12, 22 and 32 for pivotal movement relative to one another. The recessed surfaces 20 and 30 abut each other to provide a smooth pivotal scissoring movement between the first and second lever arms 12 and 22, while the legs 37 and 38 extend to either side of the first and second lever arms 12 and 22.

The handle portions 16 and 26 are adapted to be grasped by a user's hand, such that manual manipulation of the handle portions 16 and 26 towards and away from one another causes likewise movement of the jaw portions 14 and 24 of the first and second lever arms 12 and 22 towards and away from one another. The trigger portion 42 is configured to be engaged by the index finger of a user's hand. Pulling the trigger portion 42 toward the first lever arm 12 causes clockwise rotation (as represented by directional arrow 54 in FIG. 1) of the third lever arm 32 about the pivot member 52 and thereby clockwise movement (see directional arrow 56 in FIG. 1) of the jaw portion 46 of third lever arm 32 away from the jaw portion 24 of the second lever arm 22. Pushing the trigger portion 42 away from the second lever arm 22 causes counterclockwise rotation of the third lever arm 32 about the pivot member 52 and movement of the jaw portion 46 toward the jaw portion 24 of the second lever arm 22.

As seen in FIG. 4, the jaw portions 14 and 24 of the first and second lever arms 12 and 22 each include serrated edges 58 and 60, respectively. The serrated edges 58 and 60 allow the jaw portions 22 and 24 to grip objects securely. In addition, the first lever arm 12 includes a threaded opening 62, which is configured to receive a spike element 64. Spike element 64 is defined by a threaded portion 66 which is configured to threadably engage the threaded opening 62 and a cone shaped spike portion 68 that extends outwardly from the threaded portion 66. The threaded interengagement of the threaded portion 66 and the threaded opening 62 acts as an adjusting mechanism, such that rotation of the spike element 64 about its longitudinal axis 70 results in longitudinal movement of the spike element 64 relative to the threaded opening 62. In this manner, the extent to which the spike portion 68 of the spike element 64 projects outwardly from the serrated edge 58 of the jaw portion 14 can be varied. The threaded portion 66 of the spike element 64 includes a slot 72 that is configured to receive a tool such as a screwdriver, which is used to rotate the spike element 64 about its longitudinal axis 70.

As seen in FIG. 1, the first and second lever arms 12 and 22 include through holes 73 and 74, respectively. The through hole 73 of the first lever arm 12 includes a lanyard 76 which is adapted to extend about a wrist of a user to help prevent the gripping implement 10 from inadvertently slipping out of the user's hand. In addition, as seen in FIGS. 3 and 4, the first and second lever arms 12 and 22 are filled with foam floatation 78 to allow the gripping implement 10 to float in water.

In use, as seen in FIG. 5, the first and second lever arms 12 and 22 are adapted to engage an upper lip 80 of a fish 82. The first and second jaw portions 14 and 24 coact to grip the fish 82, with the spike element 64 piercing the upper lip 80 to provide a gripping force in addition to that provided by the serrated edges 58 and 60 as a result of coaction between the jaw portions 14 and 24 of the first and second lever arms 12 and 22. This extra gripping force is especially useful when handling large or tenacious fish.

When the jaw portions 14 and 24 of the first and second lever arms 12 and 22 are engaged with the upper lip 80 of the fish 82, the third lever arm 32 is within the mouth 83 of the fish 82. The third lever arm 32 is then pivoted clockwise (i.e., in the direction of directional arrow 54) via the trigger portion 42 so as to engage an inner region 84 of a lower lip 85 of the fish 82, which separates the lips 80 and 85 thereby opening the mouth 83 of the fish 82. By holding the mouth 83 of the fish 82 open with the gripping implement 10, a fish hook or bait 86 (shown with a leader 88 secured thereto) can be easily removed from the mouth 83 of the fish 82.

The spike element 64 is made adjustable so that the extent to which the spike portion 68 projects beyond the serrated edge 58 of the jaw portion 14 can be varied in accordance with the size of the fish 82 upon which the gripping implement 10 is to be used. For small fish which require little gripping force, the spike portion 68 need only project a small distance beyond the serrated edge 58 so that the spike portion 68 only pierces the upper lip 80 of the fish 82 to a small extent. With large fish, a high gripping force is needed. Hence, the spike element 64 is adjusted such that the spike portion 68 projects a greater distance beyond the serrated edge 58 so that the spike portion 68 pierces the upper lip 80 of the fish 82 to a great extent to provide a high gripping force.

As seen in FIG. 5, the jaw portion 46 of the third lever arm 32 projects beyond the jaw portions 14 and 24 of the first and second lever arms 12 and 22 so that the jaw portion does not easily slip out of the mouth 83 of the fish 82 when separating the lips 80 and 85. If the extent of the jaw portion 46 was the same or less than the jaw portions 14 and 22, the jaw portion 46 of the third lever arm 32 could slip off of the lower lip 85 of the fish 82, particularly if the fish had a large mouth.

This fish gripping implement 10 is relatively uncomplicated, and the inclusion of the spike element 64 provides a gripping force in addition to that provided by coaction between the jaw portions 14 and 24 of the first and second lever arms 12 and 22. The added gripping force is useful, particularly when handling large or tenacious fish (i.e., a fish from which extraction of a fish hook is difficult since it may be wriggling and squirming about). In addition, the lanyard 76 helps prevent the gripping implement 10 from inadvertently slipping out of a user's hand, while the foam flotation 78 within the first and second lever arms 12 and 22 allows the gripping implement 10 to float if dropped into the water.

The resultant efficient and lightweight design of this fish gripping implement 10 allows a user to hold the mouth 83 of a fish 82 in an open position to remove a hook, plug or artificial bait 86 while accomplishing the holding with the use of one hand that need never touch the fish 82. Hence, contact with the fish 82 is avoided and oils on the outer surface of the fish 82 are not disturbed. Therefore the gripping implement 10 is particularly useful in catch and release type fishing.

The fish gripping implement 10 allows big or small fish to be held with the proper degree of firmness and its lightweight design allows it to be easily carried in a tackle box. In addition, the fish gripping implement 10 can be used to grip a fish during the cleaning process.

Although the present invention has been described with reference to preferred embodiments, workers skilled in the art will recognize that changes may be made in form and detail without departing from the spirit and scope of the invention.

What is claimed is:

1. An implement for gripping a fish, comprising:
   a first lever arm having a jaw portion at one end, a handle portion at an opposite end and an intermediate portion therebetween;
   a second lever arm having a jaw portion at one end, a handle portion at an opposite end and an intermediate portion therebetween;
   a pivot member for pivotally coupling the intermediate portion of the first lever arm to the intermediate portion of the second lever arm such that manual manipulation of the handle portions of the first and second lever arms towards and away from one another causes like movement of the jaw portions of the first and second lever arms towards and away from one another;
   a spike element mounted on and extending outwardly from the jaw portion of the first lever arm, the spike element projecting toward the jaw portion of the second lever arm and being configured to pierce a body region of a fish as the jaw portions of the first and second lever arms move towards one another to provide a gripping force in addition to that provided by coaction between the jaw portions; and
   an adjusting mechanism for varying the extent to which the spike element projects outwardly from the jaw portion of the first lever arm.

2. The gripping implement of claim 1 wherein the adjusting mechanism includes:
   a threaded portion on the spike element which engages a threaded opening extending through the jaw portion of the first lever arm, whereby rotation of the spike element about its longitudinal axis causes movement of the spike element relative to the threaded opening which varies the extent to which the spike element projects outwardly from the jaw portion of the first lever arm.

3. The gripping implement of claim 2 wherein the threaded portion of the spike element includes a slot that is configured to receive a tool used to rotate the spike element about its longitudinal axis.

4. The gripping implement of claim 1 wherein the jaw portion of the second lever arm has a through aperture which freely receives the spike element as the jaw portions of the first and second levers move towards one another.

5. The gripping implement of claim 1, and further including:
   a third lever arm having a jaw portion, and trigger portion, the pivot member pivotally coupling the third lever arm to the first and second lever arms such that manual manipulation of the trigger portion pivots the third lever arm and causes the jaw portion of the third lever arm to move relative to the jaw portions of the first and second lever arms.

6. The gripping implement of claim 5 wherein the jaw portion of the third lever arm extends distally past the jaw portions of the first and second lever arms, and wherein the spike element and the jaw portions of the first and second lever arms are adapted to grip an upper lip of a fish while the third lever is adapted to engage a lower lip of a fish to separate and hold open the lips of a fish.

7. The gripping implement of claim 1 wherein the handle portion of one of the first and second lever arms includes a lanyard adapted to extend about a wrist of a user of the gripping implement.

8. An implement for gripping a fish, comprising:
   a first lever arm having a jaw portion at one end, a handle portion at an opposite end and an intermediate portion therebetween;
   a second lever arm having a jaw portion at one end, a handle portion at an opposite end and an intermediate portion therebetween;
   a pivot member for pivotally coupling the intermediate portion of the first lever arm to the intermediate portion of the second lever arm such that manual manipulation of the handle portions of the first and second lever arms towards and away from one another causes like movement of the jaw portions of the first and second lever arms towards and away from one another; and a spike element mounted on and extending outwardly from the jaw portion of the first lever arm, the spike element projecting toward the jaw portion of the second lever arm and being configured to pierce a body region of a fish as the jaw portions of the first and second lever arms move towards one another to provide a gripping force in addition to that provided by coaction between the jaw portions, the jaw portion of the second lever arm including a through aperture which freely receives the spike element as the jaw portions of the first and second lever arms move towards one another.

9. An implement for gripping a fish, comprising:

a first lever arm having a jaw portion at one end, a handle portion at an opposite end and an intermediate portion therebetween;

a second level arm having a jaw portion at one end, a handle portion at an opposite end and an intermediate portion therebetween, the first and second lever arms being filled with foam flotation to allow the gripping implement to float in water;

a pivot member for pivotally coupling the intermediate portion of the first lever arm to the intermediate portion of the second lever arm such that manual manipulation of the handle portions of the first and second lever arms towards and away from another causes like movement of a jaw portions of the first and second lever arms towards and away from one another, the jaw portions being configured to engage a body region of a fish such that coaction between the jaw portions provides a gripping force for securely holding a fish.

* * * * *

UNITED STATES PATENT AND TRADEMARK OFFICE
CERTIFICATE OF CORRECTION

PATENT NO. :   5,092,074

DATED      :   March 3, 1992

INVENTOR(S) :  Milo E. Zincke

It is certified that error appears in the above-identified patent and that said Letters Patent is hereby corrected as shown below:

ON THE TITLE PAGE

In the References Cited Section, under U.S. PATENT DOCUMENTS, insert the following:

| | | | |
|---|---|---|---|
| 2,600,445 | 6/1952  | Sundstrand | 81/49 |
| 3,028,190 | 4/1962  | Thomas     | 294/118 |
| 3,106,035 | 10/1963 | Tennyson   | 43/53.5 |
| 3,675,359 | 7/1972  | Ohno       | 43/53.5 |
| 3,820,274 | 6/1974  | Drenzyk    | 43/53.5 |
| 4,631,855 | 12/1986 | Ader       | 43/53.5 |

Signed and Sealed this

Twenty-ninth Day of June, 1993

Attest:

MICHAEL K. KIRK

*Attesting Officer*    Acting Commissioner of Patents and Trademarks